United States Patent
Vanderbeck et al.

(10) Patent No.: US 6,476,534 B1
(45) Date of Patent: Nov. 5, 2002

(54) PERMANENT MAGNET PHASE-CONTROL MOTOR

(75) Inventors: William Edward Vanderbeck, Kinnelon, NJ (US); Gregory Weston Terpay, Whippany, NJ (US); Ka-Shu Lee, Rockaway, NJ (US); George Gustave Zipfel, Summit, NJ (US); Victor G. Mishkevich, Bridgewater, NJ (US); Thomas Edward Smith, Jr., Madison, NJ (US)

(73) Assignee: General Dynamics Advanced Technology Systems, Inc., Greensboro, NC (US)

( * ) Notice: Subject to any disclaimer, the term of this patent is extended or adjusted under 35 U.S.C. 154(b) by 18 days.

(21) Appl. No.: 09/634,554

(22) Filed: Aug. 8, 2000

(51) Int. Cl.[7] .......................... H02K 21/12; H02K 1/00
(52) U.S. Cl. ...................................... 310/261; 310/268
(58) Field of Search ................. 310/75 R, 79, 310/96, 100, 68 B, 156.53, 268, 261; 318/138, 254, 439, 727, 798; 416/1, 151, 32, 47, 155, 5, 141, 157 A, 157 R, 160, 165

(56) References Cited

U.S. PATENT DOCUMENTS

| | | |
|---|---|---|
| 1,867,715 A | 7/1932 | Seidel |
| 1,879,659 A | 9/1932 | Coolidge |
| 2,443,393 A | 6/1948 | Landgraf ..................... 244/17 |
| 2,495,433 A | 1/1950 | Troller .................. 170/160.46 |
| 2,517,509 A | 8/1950 | Sikorsky .................. 244/17.11 |
| 2,554,611 A | 5/1951 | Biermann .............. 170/160.37 |
| 2,650,046 A | 8/1953 | Vanderlip ................ 244/17.13 |
| 2,716,460 A | 8/1955 | Young ..................... 170/160.1 |
| 2,845,132 A | 7/1958 | Heckman .................. 170/160.25 |
| 3,586,460 A | 6/1971 | Toner ....................... 416/144 |
| 3,588,273 A | 6/1971 | Kizilos ........................ 416/42 |
| 3,747,728 A | 7/1973 | Hollander ................. 192/58 A |
| 4,195,966 A | 4/1980 | Cornelius .................... 416/18 |
| 4,591,313 A | 5/1986 | Miyatake et al. ........... 416/155 |
| 4,648,345 A | 3/1987 | Wham et al. ............... 114/338 |
| 4,655,685 A | 4/1987 | Fradenburgh ............. 416/90 A |
| 4,702,437 A | 10/1987 | Stearns, Jr. ............... 244/17.11 |
| 4,930,988 A | 6/1990 | Griffith ....................... 416/114 |
| 5,255,871 A | 10/1993 | Ikeda ....................... 244/17.13 |
| 5,281,094 A | 1/1994 | McCarty et al. ............. 416/147 |
| 5,409,183 A | 4/1995 | Gunsallus ................ 244/17.13 |
| 5,480,284 A | 1/1996 | Wadia et al. .................. 416/91 |
| 5,490,759 A | 2/1996 | Hoffman ....................... 415/10 |
| 5,584,655 A | 12/1996 | Deering ........................ 416/31 |
| 5,584,661 A | 12/1996 | Brooks ........................ 416/238 |
| 5,588,800 A | 12/1996 | Charles et al. ................. 416/24 |
| 5,595,474 A | 1/1997 | Girard ........................... 416/1 |
| 5,626,312 A | 5/1997 | Head ......................... 244/75 R |
| 5,704,567 A | 1/1998 | Maglieri .................. 244/17.11 |
| 5,711,651 A | 1/1998 | Charles et al. ................. 416/24 |
| 5,727,754 A | 3/1998 | Carter, Jr. ....................... 244/8 |

OTHER PUBLICATIONS

Computing Electromagnetic Fields for Research and Industry: major achievements and future trends. IEEE Transactions on Magnetics, vol. 32, No. 3, May 1996, pp. 627–630.
Shape Optimization of Electromagnetic Devices using Immune Algorithm. IEEE Transactions on Magnetics, vol. 33, Mar. 1997, pp. 1876–1879.

*Primary Examiner*—Tran Nguyen
(74) *Attorney, Agent, or Firm*—Moore & Van Allen PLLC; Michael G. Johnston; William G. Dosse

(57) ABSTRACT

A motor has a rotor for controlling a parameter of an instrumentality, such as a blade or a blade flap. The rotor is positioned about the drive shaft of the instrumentality and rotates at the same average angular velocity of the drive shaft. The instrumentality is controlled by applying to the instrumentality a physical displacement signal that is generated by the phase relationship of the rotor of the motor with respect to the angular position of the drive shaft. A plurality of permanent magnets proximate the periphery of the rotor cooperate with a plurality of stator polepieces and electromagnetic coils. The current flowing through the coils is reversed each time that the rotor advances by the angular space of one permanent magnetic pole. The strength and polarity of the current flowing through the coils controls the direction and displacement of the rotor with respect to a neutral phasing of the rotor with respect to the drive shaft.

10 Claims, 12 Drawing Sheets

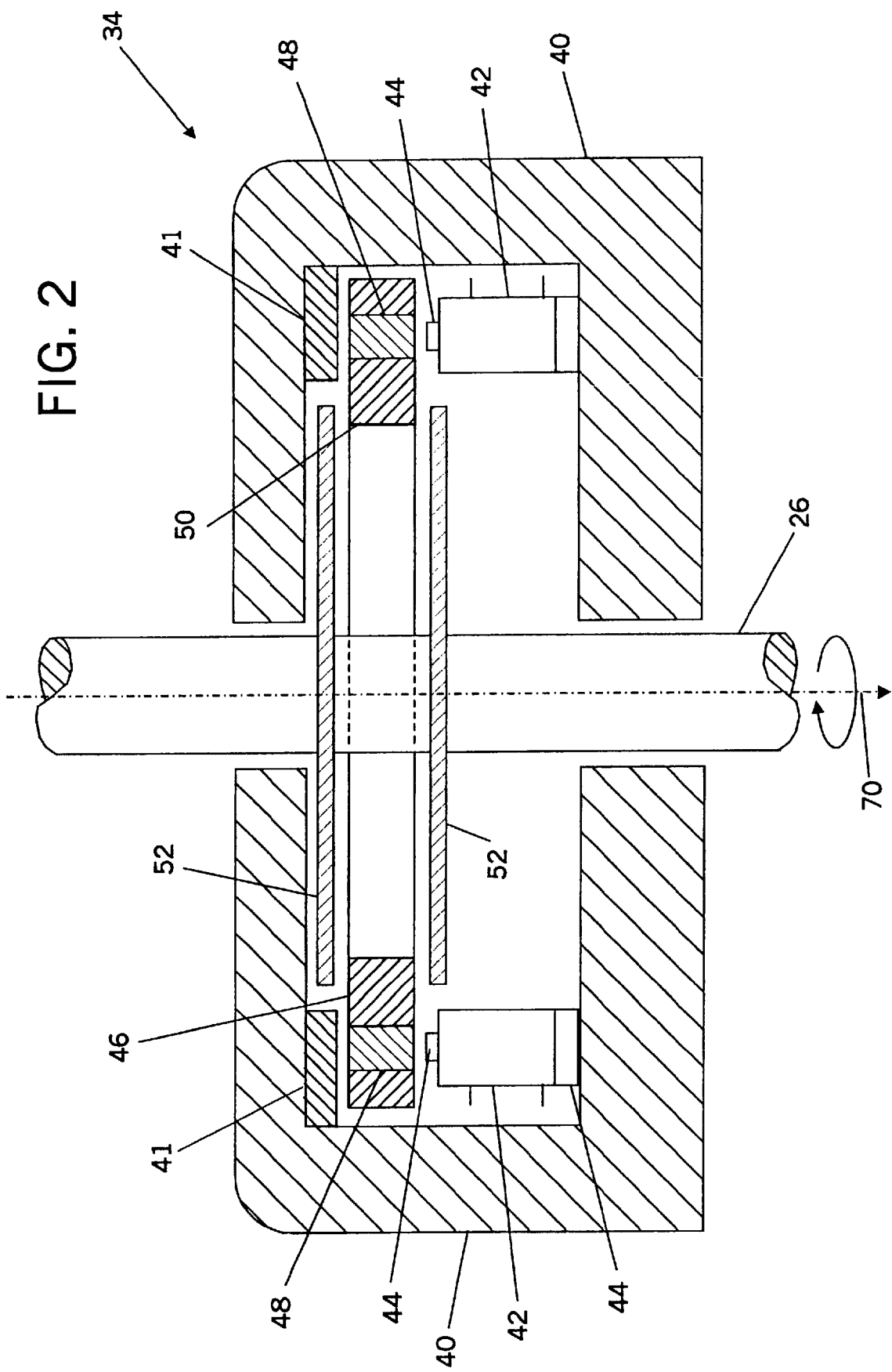

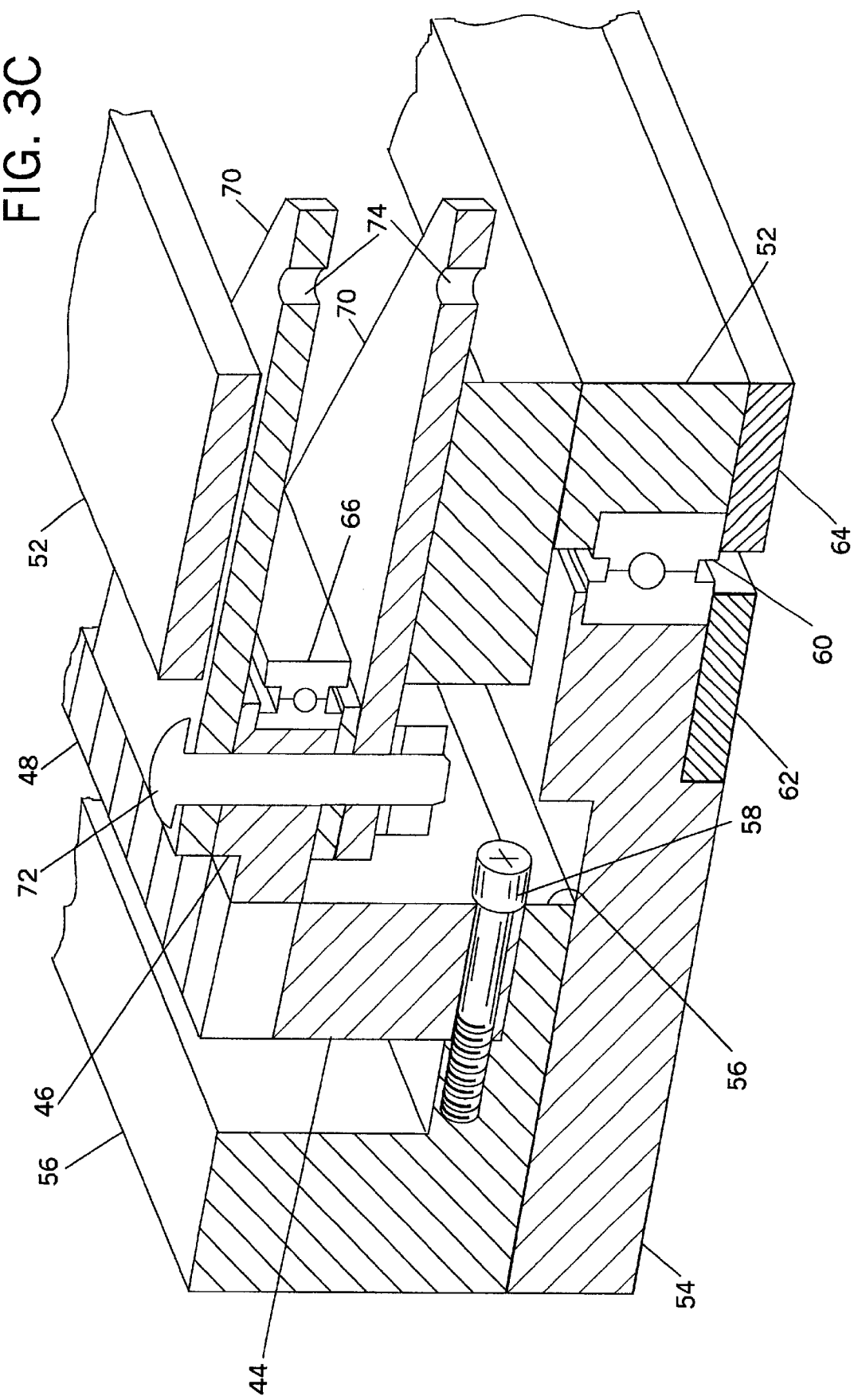

PERMANENT MAGNET PHASE-CONTROL MOTOR

This invention was made with U.S. Government support under Contract No. N00014-96-C-2079, awarded by the U.S. Navy. The Government has certain rights in this invention.

FIELD OF THE INVENTION

The present invention relates to a phase-shifting motor for rotary equipment and, more particularly, to an actively-controlled, permanent-magnet actuator for controlling an aspect of an item of rotating machinery by varying the phase of the motor rotor with respect to the rotation of the rotating machinery.

BACKGROUND OF THE INVENTION

Fundamental to the operation of many rotating machines, devices, or instrumentalities is the ability to control some aspect of the rotating portion of the instrumentality, device or machine. For example, many turbine or fan devices have facility for dynamically controlling the angle-of-attack of their rotor blades. Angle-of-attack is a factor in determining the dynamic forces acting on the blade and, hence, determining the forces applied by the blades to the frame of the instrumentality.

Control of blade angle-of-attack generally originates in the non-rotating frame of the instrumentality, rather than in the rotating coordinate reference frame of the rotating part of the instrumentality. For example, control of the variable pitch or the angle-of-attach of the blades of, for example, a wind turbine, a ship or airplane propeller, the main rotor or the torque-reaction fan or tail rotor of a helicopter are all originated within the frame of the instrumentality (e.g. the mast of a wind turbine, the airframe of an airplane or helicopter, or the engine room of a ship).

A method of bridging from the non-rotating frame to the rotating frame is required and many such bridging systems have been known for a long time. It is often a tricky mechanical engineering problem to introduce control signals or movements into a mechanism that is mounted on and turning with a rotating drive shaft. A common example of such a problem is controlling the pitch of the blades of a ship's screw propeller, an airplane propeller, a wind-driven turbine, or a helicopter's main lift rotor or torque reaction (tail) rotor. A related example is the control of leading or trailing edge flaps on either fixed pitch blades or on blades with controllable pitch.

U.S. Pat. No. 5,281,094, granted on Jan. 25, 1994, to McCarty, et al. discloses an arrangement for varying the pitch of fan blades. The blades are rotated by a main drive shaft which rotates a differential gearbox, and by rotating the gearbox, rotates the blades. A concentric shaft also enters the differential gearbox. The concentric shaft is normally locked so as to rotate with the main drive shaft. However, when the concentric shaft is unlocked, it is either rotated faster than the main drive shaft by an electric motor or braked by an electric brake so as to rotate slower than the main drive shaft. Relative rotation of the two shafts operates through the differential aspect of the gearbox in order to increase or decrease the pitch of the fan blades. When the desired blade pitch is attained, the two shafts are again locked together so as to rotate as one. U.S. Pat. No. 5,595,474, granted on Jan. 21, 1997, to Girard discloses a comparable mechanism.

As far back as the 1940s, in the helicopter art, U.S. Pat. No. 2,443,393, granted on Jun. 15, 1948, to Landgraf, disclosed a complex mechanical system for duplicating the effect of the cyclic pitch control of a helicopter by controlling trailing-edge flaps (ailerons) on the main rotor blades to affect maneuvering control of the craft.

U.S. Pat. No. 5,409,183, granted on Apr. 25, 1995, to Gunsallus, discloses using a computer with blade-response feedback and electric-to-hydraulic converters in order to control a leading-edge flap on a helicopter blade so as to affect instantaneous or cyclic blade pitch control.

U.S. Pat. No. 5,584,655, granted on Dec. 17, 1996, to Deering discloses affecting the instantaneous pitch or axis angle of a wind turbine blade by various means, in order to reduce excessive loadings due to gusty conditions.

U.S. Pat. No. 5,588,800, granted on Dec. 31, 1996, to Charles, et al. discloses the use of a trailing-edge flap near the tip of a helicopter main rotor blade to control blade vortex interaction noise.

In each of the above cases, complex arrangements are necessary to achieve the desired degree of control out at the end of a rotating shaft.

SUMMARY OF THE INVENTION

It is an object of the present invention to generate a mechanical control signal with respect to a rotating shaft from a signal source that is stationary with respect to the rotation of the shaft.

It is another object of the present invention to generate a mechanical control signal, with respect to a rotating shaft, using a transducer that occupies a minimum of axial space along the length of the rotating shaft.

It is yet another object of the present invention to generate a mechanical control signal, with respect to a rotating shaft, that is substantially equally effective at various rotational shaft speeds over the normal range of said rotational shaft speeds.

It is still yet another object of the present invention to generate a mechanical control signal, with respect to a rotating shaft, that is minimally subject to dynamic loads due to the speed of rotation of the shaft.

It is yet still another object of the present invention to generate a mechanical control signal, with respect to a rotating shaft, that is minimally subject to wear.

Still another object of the present invention is to generate a mechanical control signal, with respect to a rotating shaft, that requires a minimum of maintenance and adjustment.

Yet another object of the present invention is to generate a mechanical control signal, with respect to a rotating shaft, that operates at a rate that is at least of the same order of magnitude as the rotational speed of the shaft.

These and other objects and purposes are achieved by an electromagnetic actuator with rotor and stator portions, said rotor rotating substantially at the same average speed as the rotating shaft, with a plurality of alternately-reverse-pole permanent magnets at its perimeter and by a method of operating said actuator. A plurality of electromagnets on the stator are energized to develop a magnetic polarity of polarized areas adjacent to the poles of the permanent magnets and that reverses polarity at a frequency proportional to the rotational speed of the rotor each time that a permanent magnet on the rotor advances from one electromagnet to the adjacent electromagnet. The phasing of either the reversals or the magnitude of the energization of the electromagnetic devices being variable with respect to the rotation of the shaft so as to control the phasing of the instantaneous rotational position of the rotor with respect to the shaft, with linkage connecting the rotor to an instrumentality, for moving the instrumentality with respect to the shaft in response to a change in the phasing of the instantaneous rotational position of the rotor with respect to the shaft.

BRIEF DESCRIPTION OF THE DRAWINGS

A more complete understanding of the present invention will be had from the following detailed description when considered in connection with the accompanying drawings, wherein the same reference numbers refer to the same or corresponding items shown throughout the several figures, in which:

FIG. 2 is a schematic illustration, partially in cross section, of an embodiment of the present invention;

FIGS. 3A, 3B, 3C, and 3D are partial cross sectional views, in perspective, of a portion of the preferred embodiment of the present invention, in order to show greater exemplary detail of the construction of the preferred embodiment of the present invention;

DETAILED DESCRIPTION OF THE PREFERRED EMBODIMENTS

Environment and Utility of the Present Invention

Figure 1:
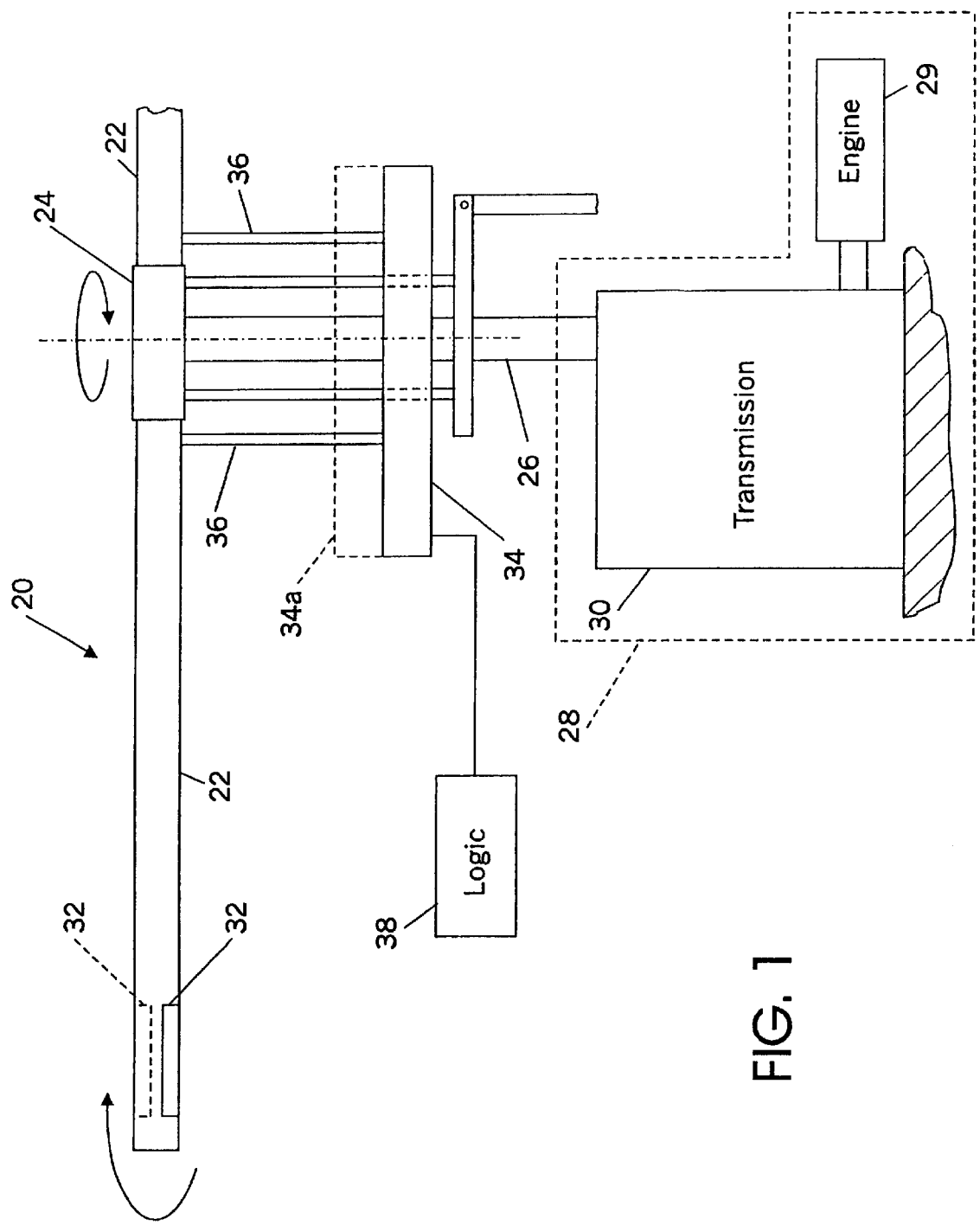
FIG. 1 is a schematic representation of applications of the present invention.

Referring now to the accompanying drawings and more particularly to FIG. 1, there is shown an example of the environment with which the present invention would be useful. An instrumentality is shown such as the main rotary-wing lift rotor or torque reaction fan or tail rotor of a helicopter, a propeller or airscrew on a propeller-driven airplane, a wind turbine, or screw propeller on a watercraft. The propeller 20 conventionally has at least two blades 22 mounted at their inboard ends to a conventional hub 24. The hub 24 rotates with a drive shaft 26 that is driven by or which drives a power device 28 which is conventionally a power source or a power sink and which rotates with the propeller 20 in order to accomplish the propeller's purpose.

The power device 28 is illustrated in FIG. 1 as comprising an engine 29 and a transmission 30, as in a helicopter. However, the power device 28 could also be an electrical generator, in the case of the propeller 20 being used as a wind turbine.

While the term "propeller" is used with the reference number 20, it will be understood by one having ordinary skill in the art that a turbine is an equivalent of a propeller for purposes of the present invention. It will also be evident to one having ordinary skill in the art that the apparatus shown schematically in FIG. 1 will ordinarily be on some conventional structure e.g., an airframe, a ship, a tower, etc. (represented by cross-hatch lines but not otherwise shown in FIG. 1, for simplicity).

The blades 22 conventionally project on their own axes, outwardly from the hub 24, in a direction substantially perpendicular to the axis of the drive shaft 26. The blades 22 are also conventionally distributed uniformly about the perimeter of the hub 24.

The blades 22 are of either of two conventional types, fixed pitch or variable pitch. Fixed-pitch blades are firmly attached to the hub 24; and, as the shaft 26 rotates, the blades 22 tend to advance the same distance, relatively, through the medium within which they rotate. Variable pitch blades 22 are rotatably attached to the hub 24, and can be rotated about their own axes with respect to the hub 24 so as to change their pitch in order to "bite" less or more of the environmental medium, depending on the pitch to which the blades have been adjusted. In the case of helicopters, the pitch of the blades can also be continuously varied by the cyclic or collective control so as to affect maneuvering of the helicopter.

A suggestion of a cyclic or a collective swash plate and control rods are shown in FIG. 1 only to illustrate the relative positions of the other components of the instrumentality. However, the cyclic or the collective swash plate and control rods are conventional and will not be described herein.

In addition or as an alternative, flaps 32 are placed on trailing edges of the blades 22 for any number of purposes (e.g., see the Landgraf patent, above). Alternatively, the flaps 32 can be placed on the leading edges of the blades 22 (e.g., see the Gunsallus patent, above).

Preferably, a motion transducer or motive device 34 is mounted about the drive shaft 26. In this location, the motive device 34 can most advantageously coordinate its control operation with the rotational position of each blade 22 of the propeller 20. Control signals are then conducted from the motive device 34 to the hub 24 along a communication path 36. The communication path 36 can be hydraulic, mechanical, electrical or any other suitable transmission medium to carry control signals from the motive device 34 to the hub 24. A logic system 38 controls the operation of the motive device 34 so as to generate the desired blade or flap movements at the appropriate angular positions of the blade about the drive shaft 26.

A single motive device 34 (as illustrated in FIG. 1), can be used to control all of the rotating parts of the instrumentality, e.g., the flaps 32 or the blades 22, together. Alternatively, one control device can be used to control a single rotating part, flap, or blade. The several additional control devices such as 34a (equal in number to the number of flaps or rotor blades, for example) can be arranged one right next to the other (like pancakes) along the length of the drive shaft 26 in FIG. 1.

Each motive device, e.g. 34, conventionally has at least two parts, one part rotates with the drive shaft 26 (e.g., a rotor).

Another part (e.g., a stator) of the motive device 34 is mounted on the mounting structure and is substantially stationary with respect to the mounting structure.

If each motive device 34 is used to control the angle or pitch of a single flap 32 or blade 22, it is possible for the effects of the several blades to be controlled individually. Therefore, the associated flap 32 or blade 22 can be changed as each blade moves with respect to the mounting structure and the medium through which it rotates. The flap 32 or blade 22 can then be changed back before completing a cycle of operation. Consequently, if the rotating portion of the instrumentality is a blade that moves relative to the medium through which it rotates (e.g., air), it is possible to reduce the noise and vibration generated by the interaction of the effects of the blades. For example, in the case of helicopter blades, it may be possible to reduce the noise and vibration conducted into or radiated from the helicopter. Additionally or alternatively, each motive device 34 (or 34a) can be used to control the angle of each flap 32 for some other purpose.

Simplified General Arrangement of the Preferred Embodiment

Referring now to FIG. 2, the motive device 34 is schematically shown partially cut away and partially in cross section, in order to illustrate the general arrangement thereof. A frame 40 (the stator) is generally of a hollow, doughnut shape with the drive shaft 26 passing though the central hole thereof. The frame 40 can be made entirely of magnetically-permeable material. However, the frame 40 is preferably made of non-magnetic stainless steel or a light alloy such as aluminum including one or more magnetically-permeable inserts 41 where necessary. Preferably, as explained more fully, below, in connection with FIG. 10, the bottom of each of a plurality of electromagnetic cores can be flared to contact or nearly contact its neighbor, so as to provide an efficient magnetic path.

Frame 40 preferably comprises at least one magnetically-permeable ring 41 so as to comprise the upper (as shown in FIG. 2) portion of the magnetic return path for the several electromagnets. If needed, in order better to serve its magnetic purpose in the presence of rapidly-changing magnetic fields, the ring 41 and the electromagnetic cores can be made of laminated structures or even of electrically-insulated powdered structures.

A plurality of individual electromagnetic coils 42, each with a central pole piece or core 44, are circularly arranged about the inside of the frame 40. Each pole piece 44 extends through the center of its associated coil 42 and is firmly mounted to the frame 40.

A permanent magnet rotor or armature disk or ring 46 is located within the frame 40 and is freely rotatable with respect to the drive shaft 26. A plurality of permanent magnets 48 are located about the perimeter of the rotor 46, near the perimeter thereof. The permanent magnets 48 preferably have their opposite poles on either side of the rotor 46, that is, up and down as viewed in FIG. 2. The poles of each permanent magnet are oppositely polarized, relative to the permanent magnet on either side of it. That is, as the rotor 46 rotates, each permanent magnet is oppositely polarized with respect to the permanent magnet that preceded it and also with respect to the permanent magnet that succeeds it. For convenient, generic, definitional purposes, each permanent magnet 48 can be considered a permanently-magnetized region.

The rotor 46 is actually a ring that is thin with respect to its diameter. This gives the rotor 46 a relatively flat dimension along the axis or length of the drive shaft 26. In rotating machinery, drive shaft length is normally to be minimized, wherever possible. Therefore, the stator housing 40 (FIGS. 2 and 3) can also have a relatively flat dimension along the length of the drive shaft 26, with the entire motive device 34 being almost disk-like, in appearance. Consequently, if necessary, several motive devices 34 can be mounted about the drive shaft 26 without necessitating an inordinate lengthening of the drive shaft. Such multiple control devices are illustrated by the second motive device 34 shown in dotted lines in FIG. 1.

The rotor 46 is constructed so as to be relatively flat and fairly large in outside diameter, with a central opening therein which affords more than ample clearance between the rotor and the drive shaft 26. The clearance between the inside edge 50 of the rotor 46 and the outside of the drive shaft 26 affords room for power, torque, or positioning take-off from the rotor 46, as described below in connection with FIGS. 4, 5, 6, and 7.

In accordance with the present invention, the rotor 46 rotates at the average speed of the drive shaft 26, changing only its angular or rotational phasing with respect to the driveshaft 26. Two carrier plates 52, which are firmly attached to the drive shaft 26, rotate with the drive shaft. The rotor 46 is rotatably supported on bearings (for clarity, not shown in FIG. 2, but shown in and described in connection with FIG. 3), between the carrier plates 52. Therefore, the rotor 46 is carried by the carrier plates 52 and associated bearings in a fixed axial and radial position with respect to the driveshaft 26 but free to rotate with respect to the driveshaft 26.

There is a motion take-off (for clarity, not shown in FIG. 2 but shown in and described in connection with FIGS. 4, 5, 6, and 7) between the rotor 46 and the carrier plates 52. This motion take-off mechanism can be a gear or lever system, a bowden wire, a hydraulic piston and cylinder, or any comparable means for transferring relative motion of the rotor 46 with respect to the carrier plates 52 via the communication path 36 (FIG. 1) to the hub 24 for affecting the orientation of the blades 22 or the flaps 30.

Detailed Construction of the Preferred Embodiment

Figure 3A:
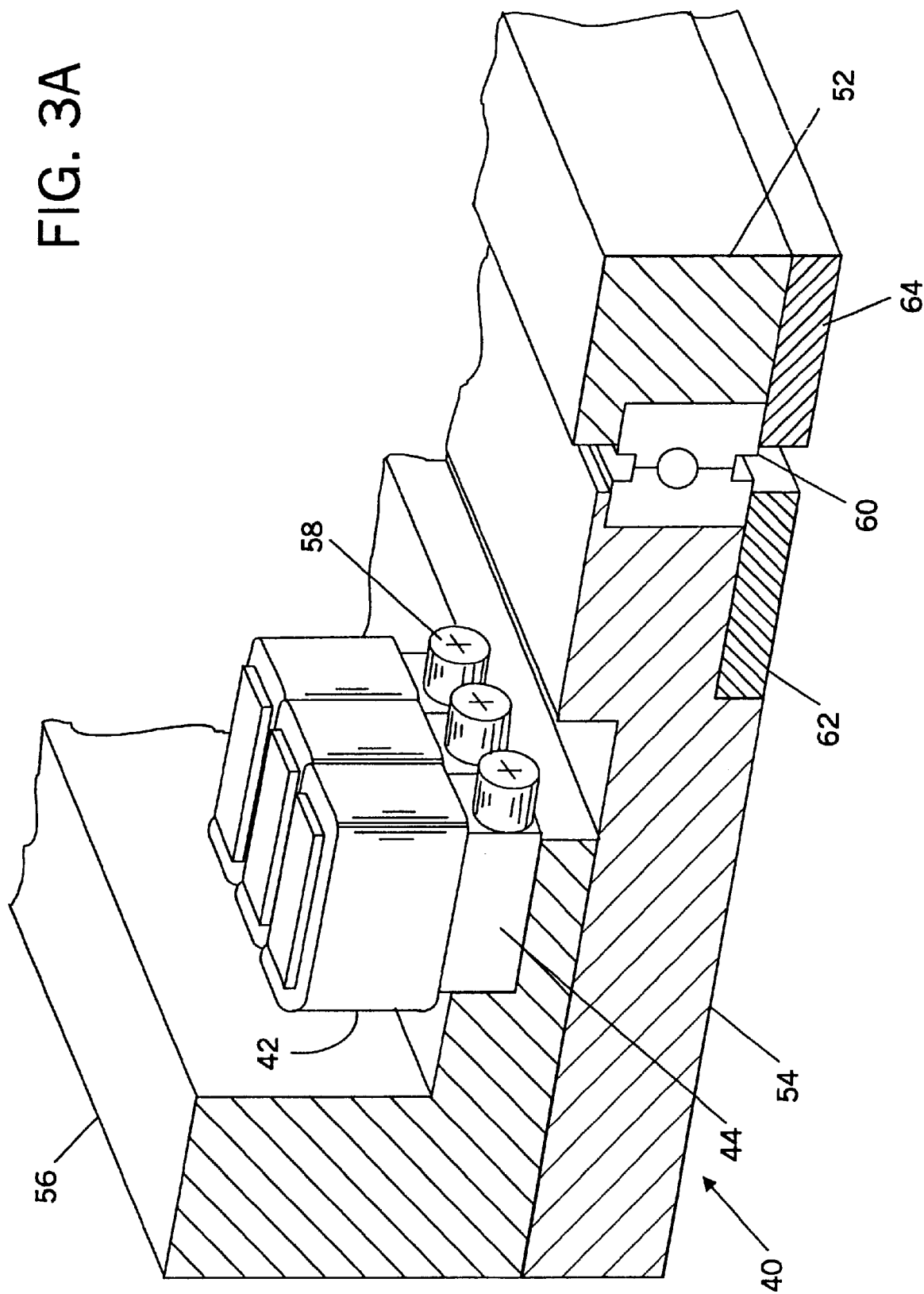
Figure 3B:
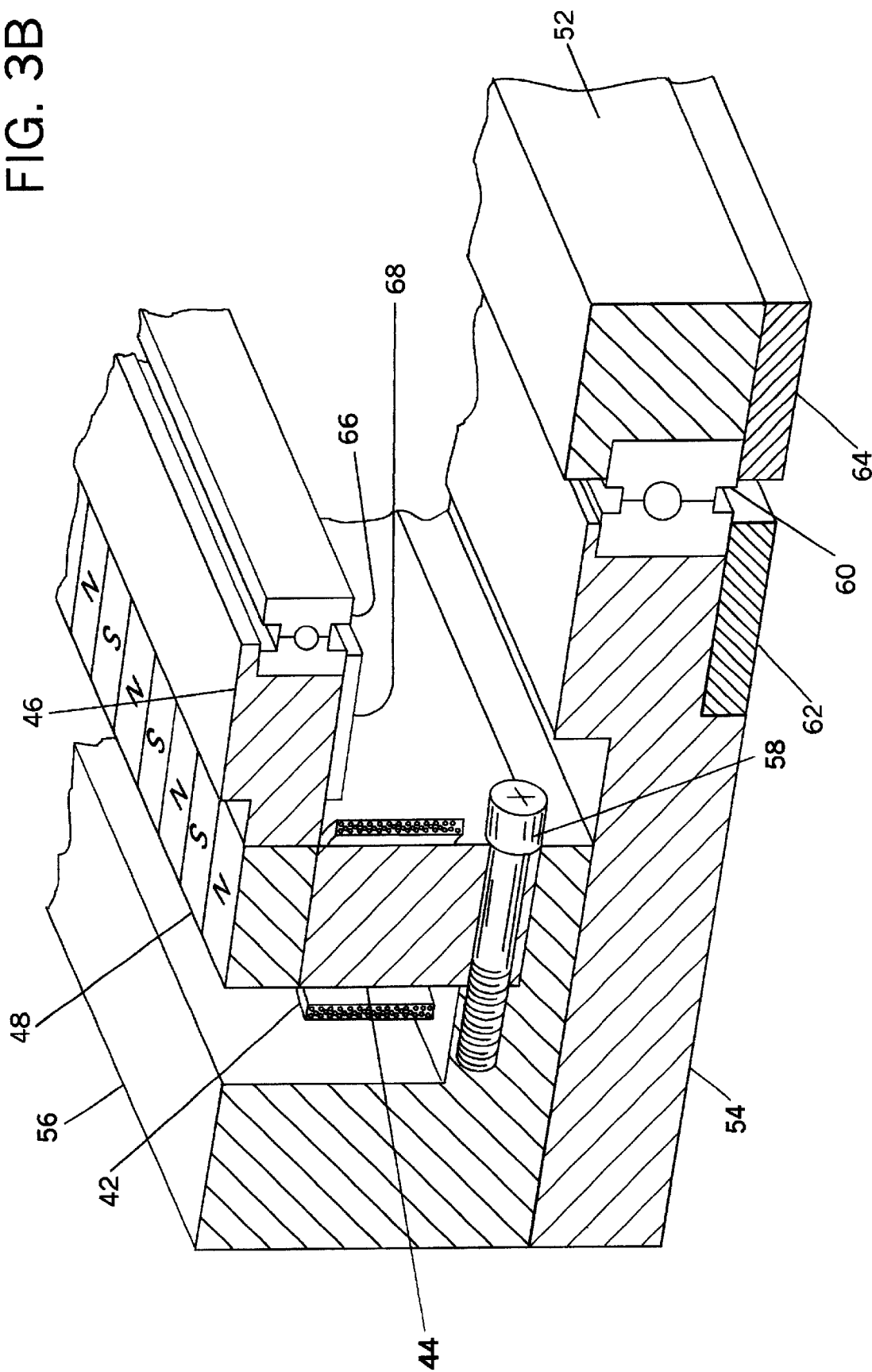
Figure 3D:
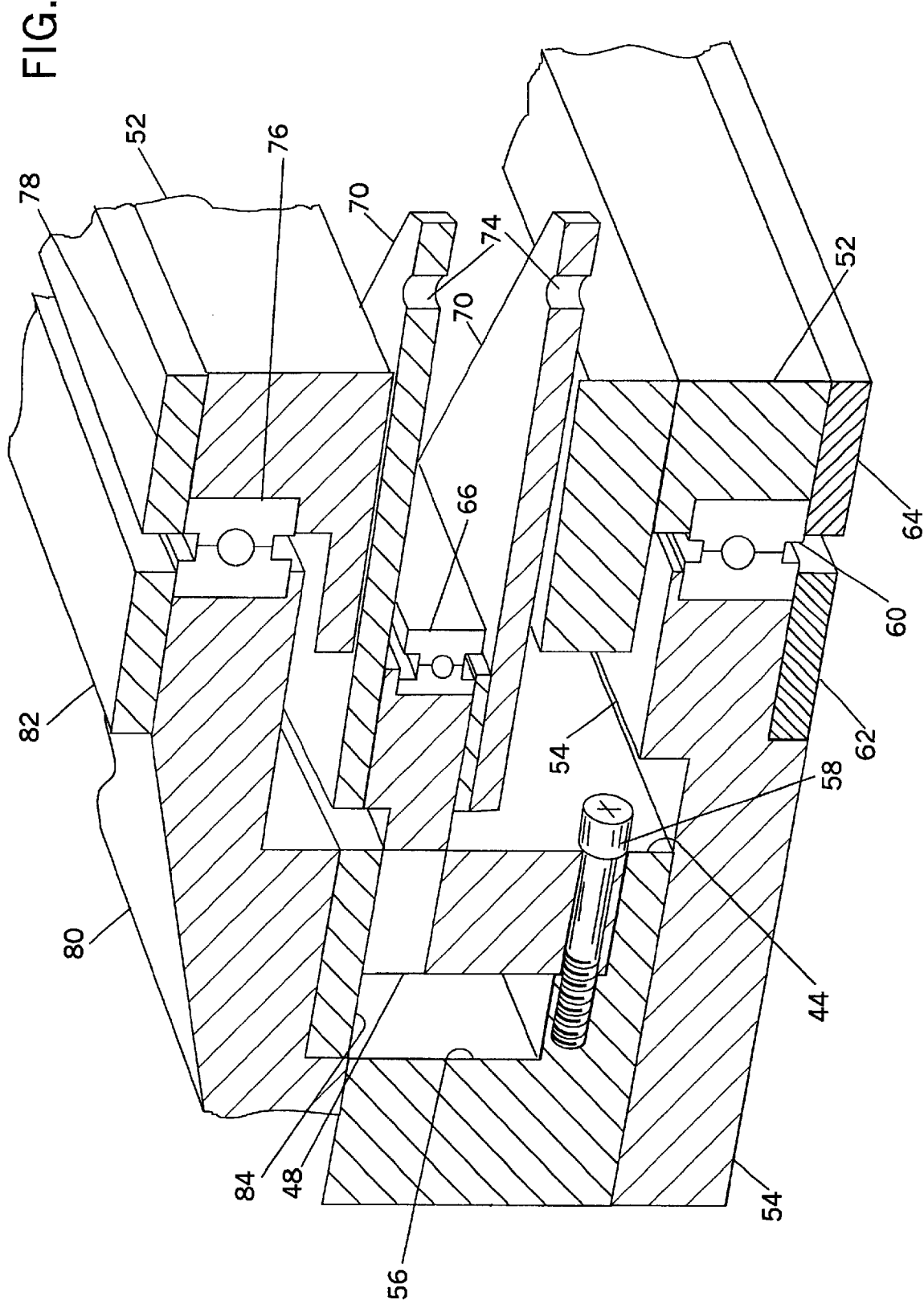

Referring now to FIG. 3 (FIGS. 3A, 3B, 3C, and 3D), there is shown in greater detail, a partial view partially in cross section and partially in perspective, in order to illustrate the structure and construction of the preferred embodiment of the present invention. As shown in FIGS. 2 and 3 the motive device 34 is an electromagnetic actuator very generally in the form of a permanent magnet motor that comprises a rotor 46 having permanent magnets 48 and a stator or frame 40 having electromagnets 42 and 44. As illustrated in FIG. 1, the frame 40 of the motive device 34 is fixedly mounted co-axially with the driveshaft 26 of the instrumentality, e.g., with the propeller 20 of FIG. 1. The motive device 34 is used to perform a control function within the instrumentality. Such control functions within rotating instrumentalities are typically performed mechanically.

The motive device of FIG. 3 is illustrated by gradual built-up stages, step-by-step, by progressing through FIGS. 3A, 3B, 3C, and 3D. Referring now to FIG. 3A, the outer frame or stator housing 40 is shown having a base plate 54 and a side frame 56 that is mounted on and fastened to the base plate 54. A plurality of electromagnet cores 44 are mounted on the side frame 56, each by a screw 58. An electrical coil 42 surrounds each electromagnetic core 44.

The outer race of an anti-friction bearing 60 is clamped to the base plate 54 by a clamping ring 62. The inner race of the anti-friction bearing 60 is clamped to the lower of the two carrier plates 52 (also shown more schematically in FIG. 2), by a clamping ring 64. The anti-friction bearing supports the periphery of the carrier plate 52 as it rotates with the shaft 26, with respect to the stationary outer frame or stator housing 40.

Referring now to FIG. 3B, the coil 42 is shown in cross section, in a way meant to represent the individual wire-ends of the coil. The armature rotor ring 46 carries a plurality of permanent magnets 48, which are arranged to pass over the upper ends (also shown more schematically in FIG. 2) of the cores 44, as the rotor ring 46 rotates about the axis of the shaft 26. The outer race of an anti-friction bearing 66 is clamped to the rotor ring 46 by a clamping ring 68.

The inner race of the anti-friction bearing 66 is supported by a structure (not shown) which is connected to the two carrier plates 52 and rotates therewith (see FIG. 3D). By thus rotatably supporting the rotor 46 for only angular circumferential with respect to the shaft 26, the rotor 46 is free to change its phase angle with respect to the shaft 26, in order to apply motive force to the instrumentality that is to be moved, e.g., the flap near the end of the helicopter main rotor blade.

Referring now to FIG. 3C, most of the structure of FIG. 3B is shown. The lower of the two carrier plates 52 is shown further extending up and out, toward the rotor 46. The upper of the two carrier plates 52 is also shown. It is the upper of the two carrier plates that has the depending structure (not shown) which supports the inner race of the anti-friction bearing 66. Two inwardly-facing ears 70 are shown fastened to the rotor by two bolts 72, only one of which is shown in FIG. 3C. Each ear 70 has a mounting hole 74 at which the piston of a hydraulic power take-off cylinder can be rotatably attached. Similarly, any number of other types of mechanical or other power take-off devices can be attached (see FIGS. 4 and 5).

Referring now to FIG. 3D, most of the structure of FIG. 3C is shown. The upper of the two carrier plates 52 is shown extended in the upward direction in order to engage the inner race of an anti-friction bearing 76. The inner race of the anti-friction bearing 76 is clamped to the upper of the two carrier rings 52 by a clamping ring 78. An upper cap ring 80 is fastened to the top of the side frame 56 and extends to the outer race of the anti-friction bearing 76. A clamping ring 82 clamps the outer race of the anti-friction bearing 76 to the cap ring 80. Since the cap ring 80 forms part of the outer frame or stator housing of the motive device 34, the cap ring 80 is also stationary with respect to the rotating shaft and carrier plates 52.

The first and preferred use of the present invention is expected to be in connection with transportation machines, and particularly with aircraft. Therefore, it is preferred that the base plate 54, the side frame 56, and cap ring 80 all be constructed of aluminum or some other lightweight material, not necessarily having magnetic properties. Consequently, a magnetic ring 84 is preferably fastened to the cap ring 80, so as to be positioned above the permanent magnets 48. The magnetic ring 84 provides a magnetic flux return path from the top of one permanent magnet to the top of the two adjacent permanent magnets. It will be remembered that the preferred arrangement of the permanent magnets 48 is such that adjacent permanent magnets shall be oriented in an alternating magnetic polar sense.

The electromagnetic cores 44 are magnetically interconnected by being flared at their lower ends (as described below, in connection with FIG. 10).

The coils 42 are preferably connected in series, as described below and as depicted schematically in FIG. 8. The coils 42 are wound and interconnected so that, with the same electrical current flowing through all of the coils, the magnetic poles of adjacent electromagnets are of opposite magnetic polarity. That is, the coils 42 are so interconnected that the electric currents through the coils 42 are so polarized that a magnetic flux is produced within each core 44 that is of opposite polarity to the polarity of the magnetic flux produced in the two adjacent cores. Therefore, the magnetic flux flowing in each core 44 is of the opposite polarity to its succeeding coil 42, around the axis of the shaft 26. As will be explained in more detail below, the polarity of the current flowing in the coils is rapidly reversed as the main driveshaft 26 of the instrumentality, e.g., the propeller 20 of FIG. 1, rotates.

Another purpose for connecting all of the coils 42 in series is to make the magnetic flux flowing through all of the cores 44 as uniform as possible. That is, variation of flux flowing through the several cores 44 is to be minimized.

Positional Take-off From Rotor 46

Relative rotational motion of the rotor 46 with respect to the carrier plates 52 and thus with respect to the driveshaft 26 is used to control the pitch of the blades 22 or the blade flaps 32 of the instrumentality or propeller 20 (FIG. 1). The control linkage along the communication path 36 (FIG.1), between the rotor 46 and the carrier plates 52, at one end, and the instrumentality at the other end, may be, for example, either hydraulic or mechanical.

One of the many possible positional take-offs from the rotor 46 is exemplified by the use of a hydraulic communication path 36 (FIG. 1). Such a hydraulic positional take-off is shown schematically in FIG. 4. A hydraulic master cylinder 90 is pivotally mounted to the carrier plates 52. A piston (not separately shown) is located within the master cylinder 90. A connecting rod 92 of the piston extends out of the end of the master cylinder 90 and is rotatably attached by a pivot pin to the inwardly-facing ears 70 through holes 74 (see FIG. 3C).

As the shaft 26, and with it the carrier plates 52, and the rotor 46 change relative angular positions, the piston (not separately shown) moves within the cylinder 90. The movement of the piston within the cylinder 90 forces hydraulic fluid to move through the hydraulic fitting(s) (not shown) of the cylinder 90.

There is preferably one hydraulic hose or line (not shown) connected to the cylinder 90, which comprises the communication path 36 of FIG. 1. As described more fully below, in connection with FIG. 5, there are preferably two cylinders 90 to develop hydraulic force to push the blade 22 or flap 32 in one direction; and there are two more cylinders 90 to push the blade 22 or flap 32 in the opposite direction. The use of four hydraulic cylinders 90 facilitates slimmer cylinder diameters, and the use of four cylinders offers better balancing of forces within the motive device 34.

Alternatively, the hydraulic cylinder can be double acting to provide a push-pull, control of the blade or flap. As another alternative arrangement, with an appropriate biasing arrangement of the associated blade 22 or flap 32 (FIG. 1), a single-acting hydraulic cylinder and a single line would be sufficient.

Figure 5:
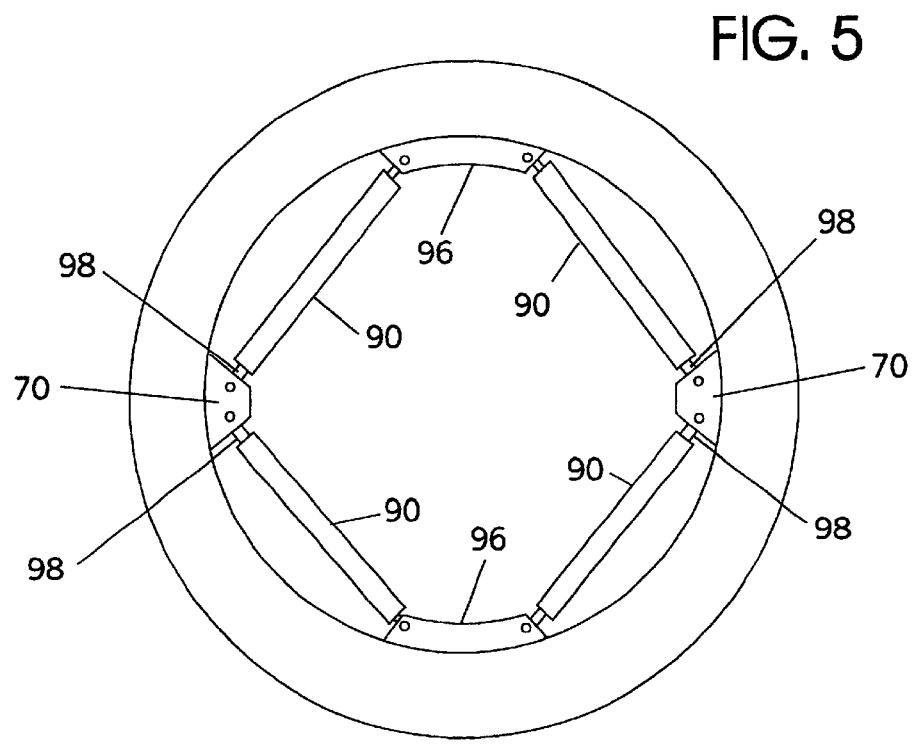
FIG. 5 shows a partial view, taken in the direction of the axis of the rotating shaft of a machine with which the communicating means of FIG. 4 is preferably arranged about the rotating shaft.

A four-cylinder hydraulic arrangement is illustrated schematically in FIG. 5. Each of two reference ears 96 is preferably attached to both of the two carrier plates 52 (FIG. 3D). A pair of hydraulic cylinders 90 is pivotally attached to each reference ear. The piston shafts 98 of a pair of hydraulic cylinders 90 are pivotally attached to each of the inwardly-facing ears 70 of the rotor 46 (FIG. 3C).

As the rotor 46 moves in one direction with respect to the carrier plates 52, the pistons of two of the hydraulic cylinders 90 are pushed deeper into the cylinders, forcing hydraulic fluid to flow under pressure in the associated hose or line (not shown) in the communication path 36. Simultaneously, the pistons in the other two hydraulic cylinders 90 are partially withdrawn within their associated cylinders, thereby allowing space to accommodate the flow of hydraulic fluid thus displaced within the push-pull hydraulic system for moving the blades 22 or flaps 32 (FIG. 1). When the rotor 46 moves in the opposite direction with respect to the carrier plates, the functioning of the two pairs of hydraulic cylinders 90 is exactly reversed, to move the blade 22 or flap 32 in the opposite direction.

Figure 4:
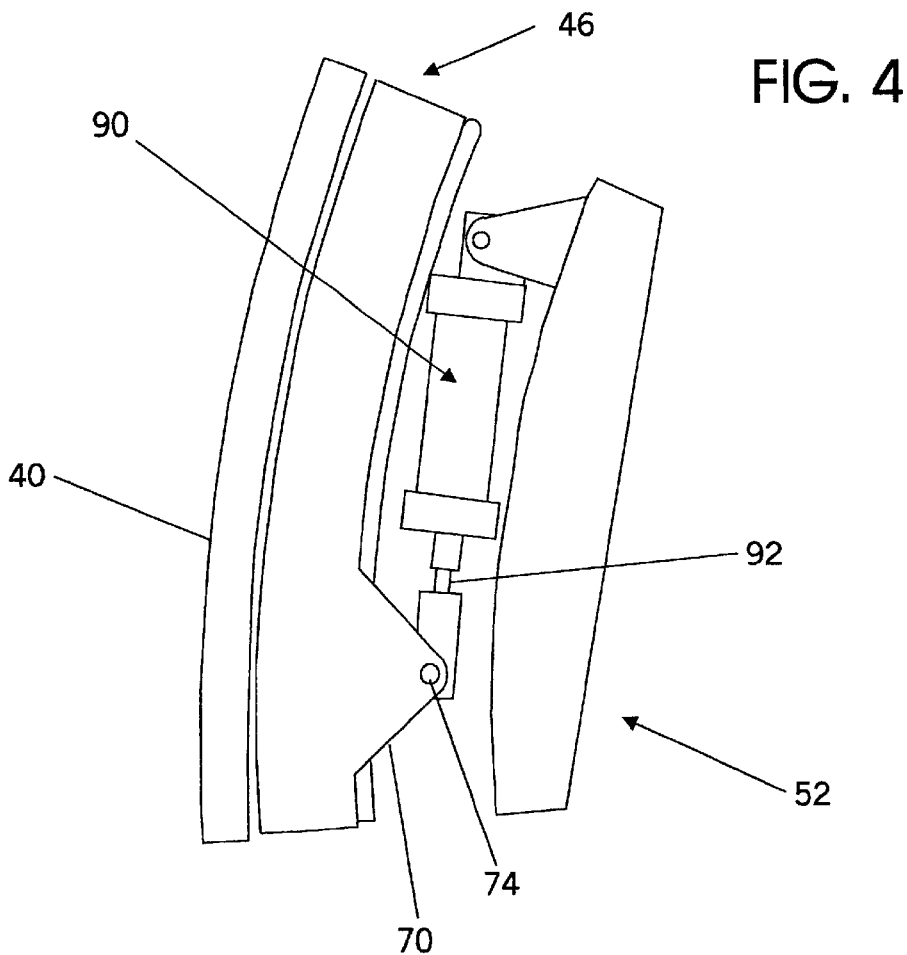
FIG. 4 shows a partial view, taken in the direction of the axis of a rotating shaft of a machine with which the present invention might be used, showing one exemplary means for communicating to the rotating machine any phase change between the rotating shaft and the rotor or armature of the present invention.
Figure 6:
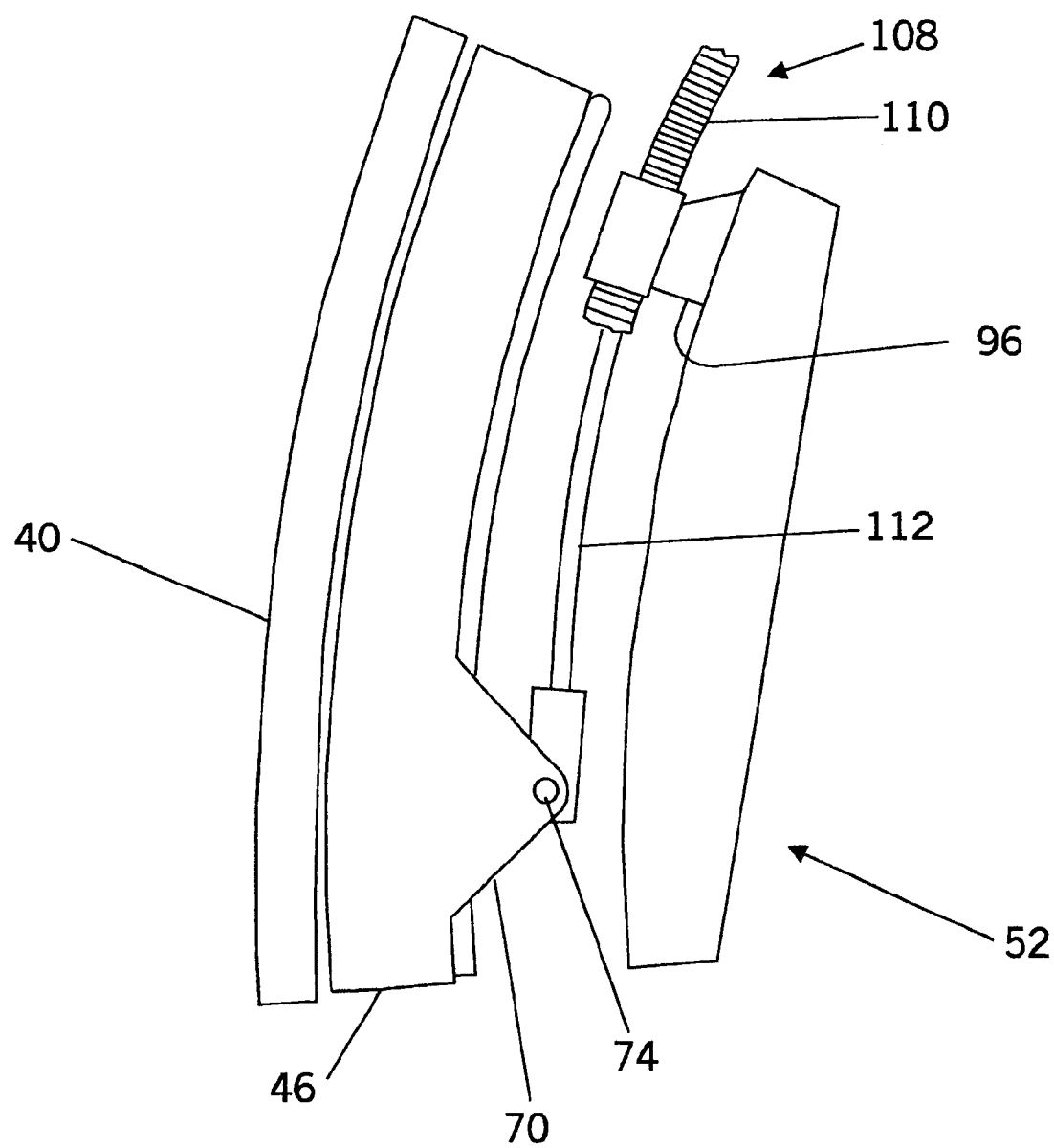
FIG. 6 illustrates a phase communicating mechanism that is a mechanical equivalent alternative of that shown in FIG. 4.

Referring now to FIG. 6, there is shown an alternative, mechanical embodiment to the hydraulic system depicted in FIGS. 4 and 5. A bowden wire assembly 108, such as a motorcycle brake or clutch cable, is shown with its outer, spiral sheath 110 conventionally clamped to a reference ear 96 of the carrier plates 52 (only a portion of which is shown in FIG. 4). A communication rod 112 passes through the spiral sheath 110 and is pivotally attached to the inwardly-facing ears 70 of the rotor 46.

The bowden wire 108 carries the positional signal through the communication path 36 (FIG. 1). While the use of only one ear 70 and one bowden wire assembly 108 might be a less costly alternative, two ears are preferred. Two ears and bowden wire assemblies 108 would enable the use of a push pull arrangement to rotate the blade 22 or the flap 32 of FIG. 1. A two-bowden-wire system for the communication path 36 is more likely to result in a more rigid and efficient mechanism.

Therefore, as the rotor 46 moves circumferentially with respect to the drive shaft 26 (FIG. 1), to which the carrier plates 52 are firmly connected, the communication rod 112 slides longitudinally within the sheath 110 of the bowden wire 108. Therefore, the bowden wire assembly 108 comprises the communication path 36 (FIG. 1). Consequently, this movement of the rod 112 with respect to the sheath 110 is communicated to the associated blade 22 or flap 32 (FIG. 1). As a result, the relative movement of the rod 112 inside the sheath 110 of the bowden wire assembly 108 changes the pitch of the associated blade 22 or moves the associated flap 32.

Electrical Drive of the Electromagnetic Coils 42

The force which produces the relative motion of the permanent-magnet rotor 46 and the carrier plates 52 of the drive shaft 26 (FIGS. 2 and 3) is derived from the interaction of the magnetic flux produced in the electromagnetic pole pieces 44 by reason of the electrical current in the non-rotating coils 42 with the magnetic field of the permanent magnets 48 on the rotating permanent-magnet-holding rotor 46.

If the current in the coils 42 was in a constant direction and did not reverse polarity with the passage of each permanent magnet 48, the direction of the force acting on the magnets would alternate as each successive (oppositely-polarized) permanent magnet passed over a given electromagnetic core 44. This would produce no useful effect.

In order to achieve a force of controllable magnitude and sense so as to advance and retard the rotor 46 with respect to the driveshaft 26, the direction of the current passing through the coils 42 is reversed as each permanent magnet 48 passes over a pole piece 44. This commutation is accomplished by a switching amplifier that is triggered by one or more conventional position sensors, which sense the movement of the rotor with respect to the pole pieces 44. The preferred position sensor is one or more coils or other type of magnetic flux sensor. Such magnetic flux sensors should preferably be fixed with respect to the electromagnetic coils 42. Alternatively, the voltage generated in one or more electromagnet coils 42 by the passage of the permanent magnets 48 over the pole pieces 44 can be used to trigger a reversal of the current in the electromagnet coils 42. As an alternative type of rotor position sensor, any of a plurality of non-magnetic types of sensors can be used, such as an optical sensor.

When a permanent magnet 48 passes the sensor (either one of the coils 42 or a separate sensor), the output from the sensor is used to determine both the timing or phasing of the passage of the permanent magnet and its magnetic polarity. The output of the sensor is then conventionally used to signal one or more electronic power switching amplifiers to reverse the direction of the current in the coils 42. The only requirement of such amplifiers is to deliver the desired magnitude of current to the coils in the proper polarity and to switch that polarity at the proper instant.

In the example of the blade 22 and the flap 32, the fluid passing over the propeller blade 22 will bias the flap 32 to the neutral or center position, aligned with the adjacent edge of the blade. The relative rotation of the rotor 46 and the shaft 26 will tend to drive the flap 32 either up or down with respect to the trailing edge of the blade 22.

The polarity of the current in the coils 42 is always switched exactly as the center of the permanent magnet 48 is aligned with the center of the pole piece 44. The electrical and magnetic power to either advance or retard the rotor 46 with respect to the drive shaft 26 is the magnitude of the current in the coil 42.

A high current just after the permanent magnet 48 passes the pole piece 44 will repel the permanent magnet from the pole piece just passed and pull the permanent magnet toward the next pole piece. By thus urging the permanent magnet, and with it the rotor 46, forward, the rotor 46 will tend to advance with respect to the drive shaft 26.

To retard the rotor with respect to the drive shaft 26, acting upon the blade 22 or the flap 32, the electric current through the coil 42 is so polarized to retard the rotor 46 with respect to the drive shaft 26. That is, the polarity of the current in the coil 42 is selected to pull the permanent magnet against its motion to leave the pole piece or core 44. Also, that same polarity of the current in the coil 42 tends to push against and thus retard the next permanent magnet that is approaching the coil and its core 44.

The above control of current amplitude and polarity to move the rotor 46 forward or backward with respect to the shaft 26 is the preferred mode of use of the present invention It is possible, as an alternative embodiment and mode of use of the present invention, for the rotor 46 to be biased to the retarded or advanced condition, with respect to the drive shaft 26, as by aerodynamics, spring, or other loading of the blade 22 or the flap 32 (FIG. 1). That bias loading can be either in the direction to retard or to advance the rotor 46. In such a case, simply weakening the strength of the coil current and thus the electromagnetic field, will allow a retarding bias or an advancing bias to retard or to advance the rotor 46 with respect to the drive shaft 26.

It will be evident to a person having ordinary skill in the art that, as the rotor 46 advances or is retarded, the phasing of the center of each permanent magnet 48 also advances or is retarded, with respect to the shaft 26. The moment when the center of a permanent magnet crosses the center of a pole piece 44 marks the point at which the current through the coils 42 is reversed. Therefore, the phasing of the reversals of the energizing polarity of the electromagnets also varies with respect to the rotation of the shaft 26. Consequently, as the phasing of the energizing current reversals in the coils 42 changes, with respect to the shaft 26, that phasing translates directly in to control of the associated parameter of the instrumentality 20.

Figure 7:
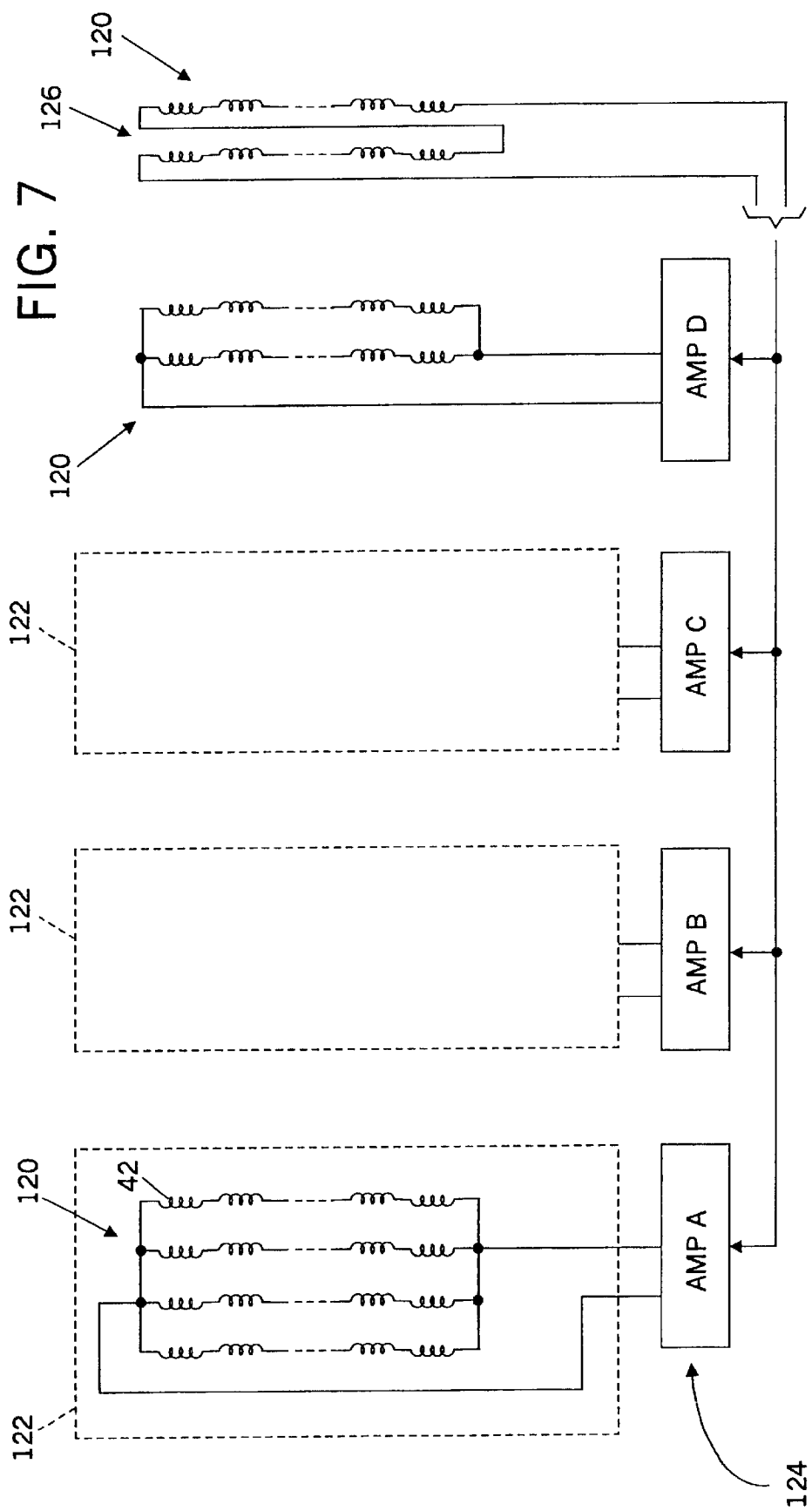
FIG. 7 is a block diagram of an exemplary electronic circuit for controlling the phase between the rotating shaft and the rotor or armature of the present invention.

Referring now to FIG. 7, there is shown a block diagram of an exemplary circuit for operating the control device (permanent magnet motor) 34. In the preferred embodiment of the present invention, there is a large number of coils, magnetic cores, and permanent magnets. Since the electrical current in the coils that drive the rotor 46 are preferably reversed simultaneously, they are preferably all connected in series, so that the same current flows through each coil, thereby maximizing the uniformity of coil energization. However, amplifiers strong enough (high voltage capability) to drive so many magnetic coils in series are not readily available, especially in inexpensive, integrated-circuit form.

Alternatively, the coils could all be connected in parallel. This would require an amplifier with only modest voltage capability but with very high current capability. Also, it is expected that uniformity of coil excitation may be compromised over a series connection.

Therefore, in an effort to achieve a practical application, a compromise is preferred, as illustrated in FIG. 7. Eleven coils 42 are connected in series to form a string 120 of series-connected coils. Four strings 120 are connected in parallel to make up a coil block 122. There are three blocks of forty-four coils, each. Each of the three coil blocks is connected to the output of an amplifier 124 (AMPs A, B, and C).

The last forty-four coils are divided in half. Two strings 120 are connected in series and are used as a rotor position sensor 126, the output of which is used to trigger the amplifiers 124 to reverse the current in the other coils. The other two strings are connected in parallel and connected to the output of a fourth amplifier 124 (AMP D). The output of the fourth amplifier is adjusted to recognize that it is only energizing two strings of coils. The arrangement of FIG. 7 is a compromise which sacrifices the outputs of two strings of coils in an effort to obtain ample sensor signal strength to trigger the amplifiers 124.

Figure 8:
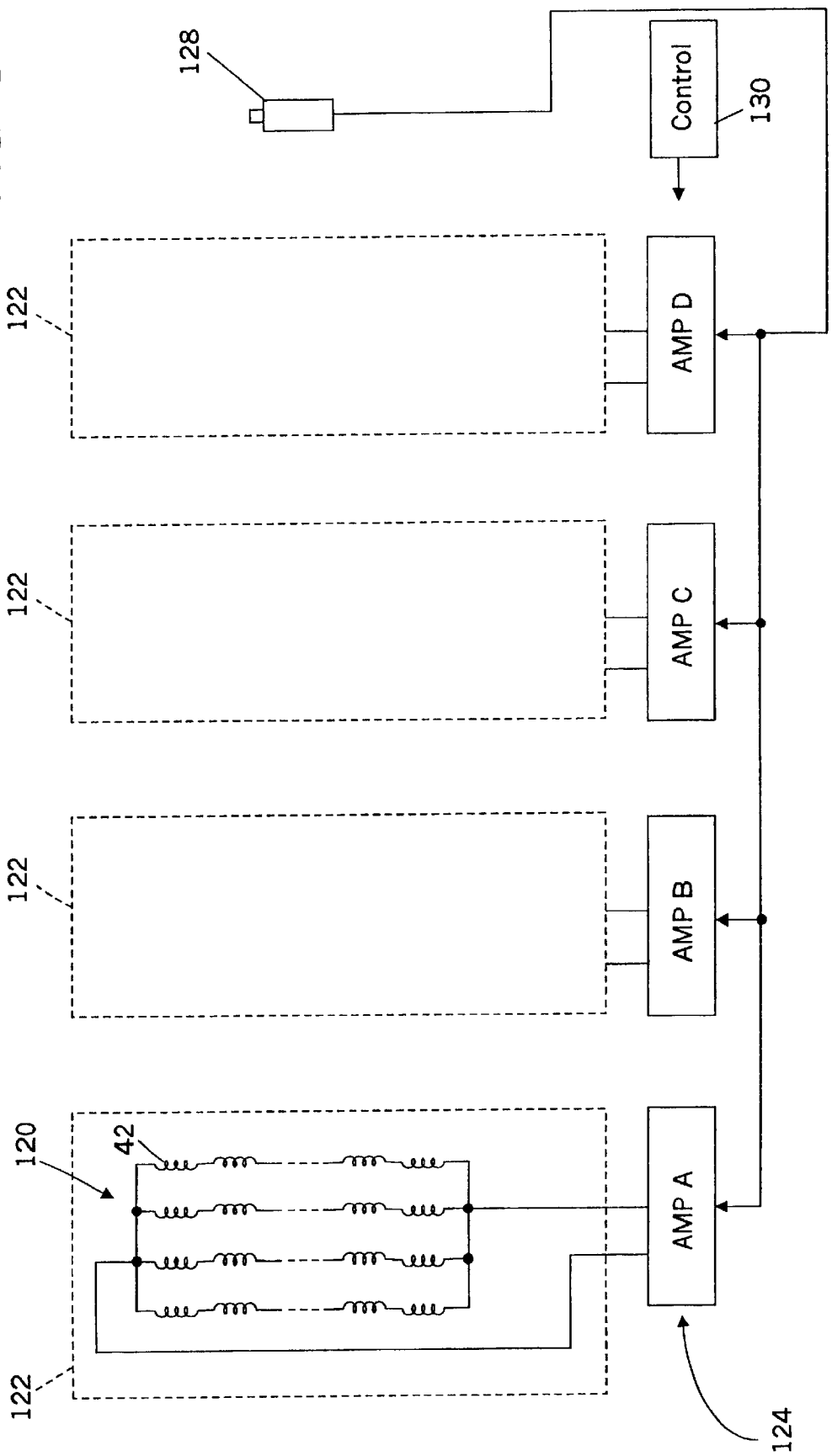
FIG. 8 is a block diagram of an alternative electronic circuit for controlling the phase between the rotating shaft and the rotor or armature of the present invention.

FIG. 8 illustrates another alternative compromise which also uses strings 120 of eleven series-connected coils 42. Four strings 120 are connected in parallel to form one coil block 122. However, four of the coil blocks 122 are connected to the four amplifiers 124. A separate sensor 128 provides the rotor-position information to trigger the four amplifiers 124.

The movement of the rotor 46 relative to the shaft 26 can be very simply controlled by merely moving the sensor 128 angularly within the housing of the motive device 34. Alternatively, the magnitude of the current driving the coils 42 can be increased or decreased in order to move the rotor 46 relative to the shaft 26. Such control can be realized by the use of an appropriate controller 130 which controls the output of all four of the amplifiers 124.

However, for a more complex environment such as controlling the position of a noise-and-vibration-attenuating flap 32 on a blade 22 of the main lift rotor of a helicopter, the controller 130 is preferably a conventional stored program computer or some other form of electronic signal processor. For such a more complex purpose, the controller would automatically control the amplitude of the output of the amplifiers 124 based upon its programmed response to the outputs of one or any number of noise and vibration sensors (not shown) at locations throughout the helicopter.

The above description and FIGS. 7 and 8 illustrate connection of the coils 42 in series and/or parallel, using four amplifiers 124. However, it will be evident to a person having ordinary skill in the art that there would be an equivalent result if the coils 42 were all connected in series or parallel or if each coil 42 were connected to its own amplifier, each amplifier being driven in the same manner as the amplifier 124.

A propeller blade 22 or a flap 32 (FIG.1) is either biased to one extreme orientation or is completely unbiased. If unbiased, the control device and the amplifiers 124 are preferably arranged to swing the blade or flap in either direction from an assumed neutral position by the polarity and amplitude of the output of the amplifiers 124.

In realistic operation, there is usually some aero- or hydro-dynamic tendency to center the blade 22 or the flap 32 to a centered or neutral orientation or position, from which the motive device 34 displaces it in at least one or either direction. The direction of blade or flap displacement from its neutral position is controlled by the polarity of the output of the amplifier 124. Similarly, the extent of movement of the propeller blade 22 or the flap 32 from its center or neutral position is related to the amplitude, timing, or magnitude of the output of the amplifier 124.

Alternatively, the blade 22 or the flap 32 can be biased toward one of its extreme positions. In that case, the motive device 34 (FIG. 1) normally pulls the blade 22 or the flap 32 toward its opposite extreme position, against its bias force. That bias force can be provided by a spring or by aero- or hydro-dynamic forces, etc.

Radial Magnetic Orientation

Figure 9:
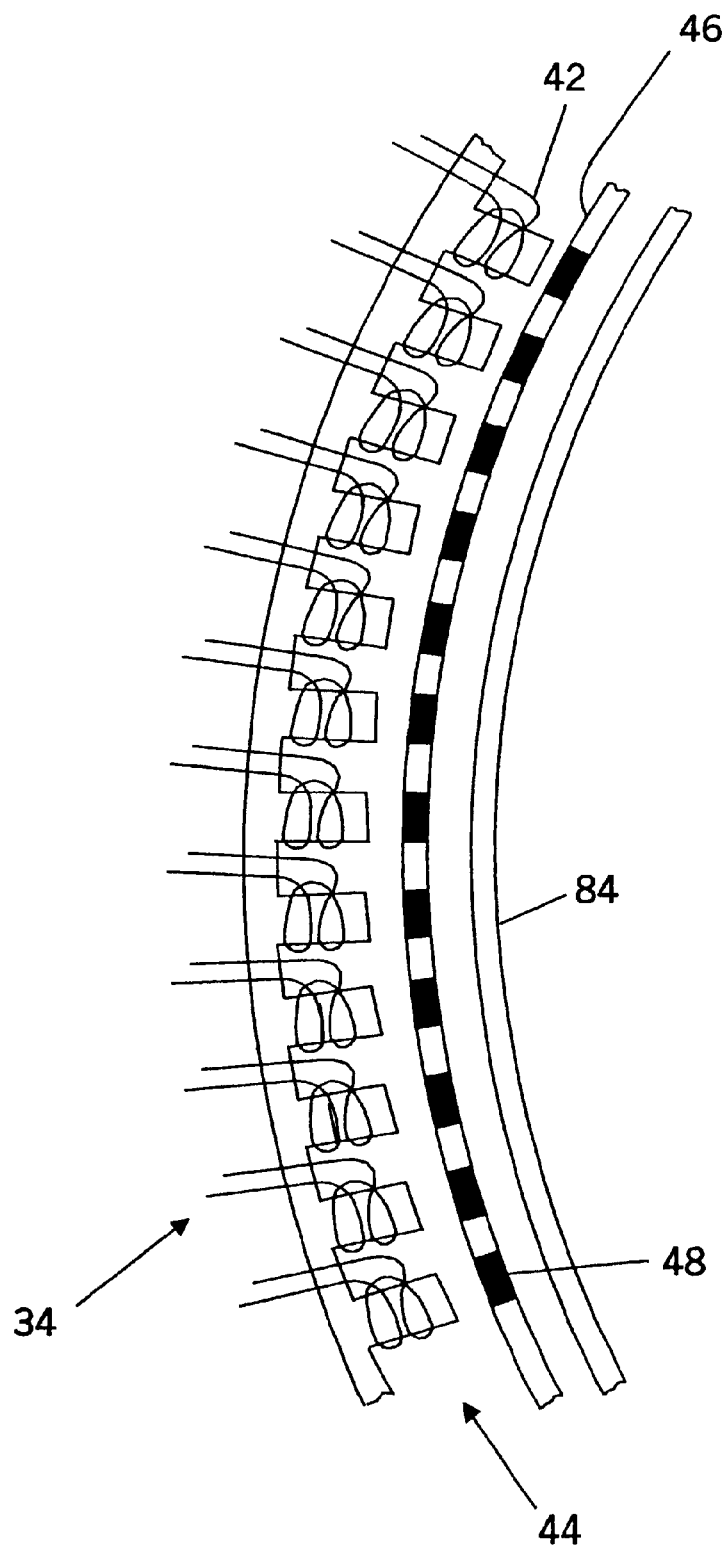
FIG. 9 illustrates an alternative arrangement of the permanent magnets and the electromagnets of the motor of the present invention.

Referring now to FIG. 9, there is illustrated an alternative orientation of the permanent magnets 48 and the electromagnet coils 42. The rotor 46 has a plurality of permanent magnets 48 positioned around its periphery, with their flux paths oriented radially, rather than axially, as shown in FIGS. 2 and 3. The electromagnetic core structure 44 can be of unitary construction around the entire circumference of the inside of the motive device 34. Alternatively, there can be arcuatly-shaped segments of electromagnetic cores placed around the inside of the motive device 34. As another alternative, the core structure 44 could involve individual cores 44, each positioned in close proximity to its neighbor, as illustrated in FIG. 3A.

Coils 42 are placed or wound around each core element that projects radially inward toward the rotor 46. Permanent magnets 48 are placed at appropriate intervals around the periphery of the rotor 46, such that their flux paths are oriented radially, with each permanent magnet oriented in the opposite polar sense to its two adjacent neighbors.

A magnetic ring 84 is placed just radially inward of the rotor 46, in order to provide a flux path on the side of the permanent magnets on the side opposite the pole pieces or core structures 44. The magnetic ring 84 can be an integral part of the rotor 46. However, if the mass of the rotor 46 is to be minimized, the magnetic ring 84 can be mounted integral with one of the carrier plates 52, but in immediate proximity to the rotor 46. Alternatively, the magnetically-permeable ring 84 can also be mounted in a fixed relationship with respect to the pole pieces or cores 44, as with the magnetically-permeable ring 41 of FIG. 2 and 84 of FIG. 3D.

The arrangement illustrated in FIG. 9 can also be turned inside out, with the pole pieces or cores 44 being radially inside of the rotor 46 and with the magnetically-permeable ring 84 being radially outside of the rotor 46.

In every other respect, the arrangement illustrated in FIG. 9 is the same as the arrangement illustrated in FIGS. 2 and 3.

Construction of Magnetic Cores 44 with Coils 42

Figure 10A:
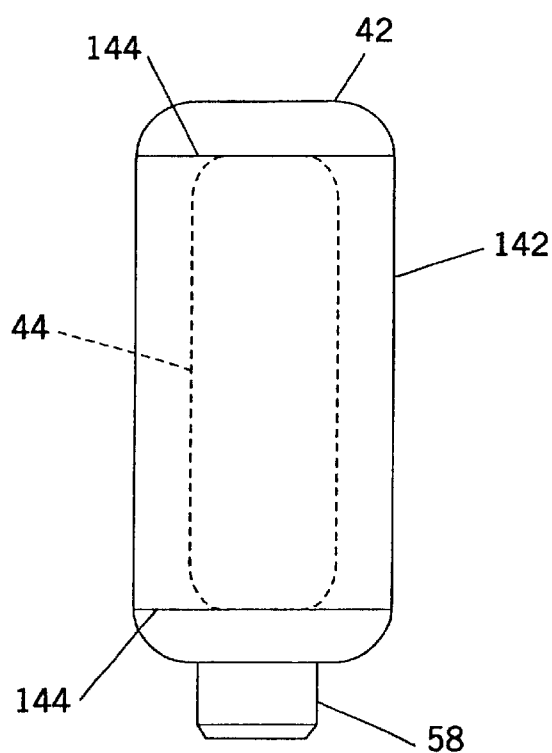
FIGS. 10A and 10B illustrate the shape of the core and coil of the electromagnet of FIG. 3, arranged to provide an efficient flux path.
Figure 10B:
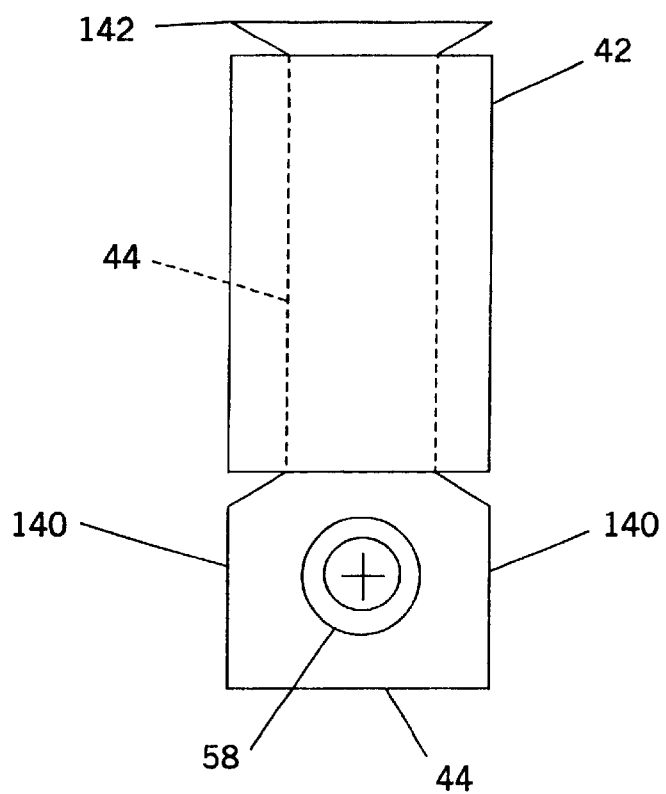

FIGS. 10A and 10B are provided in an effort to promote a better understanding of the nature of the flux return paths through the several cores 44 placed about the periphery of the inside of the motive device 34, as shown in FIG. 3A. FIG. 10B shows the front view of the core 44 with the coil 42 wrapped around the core. The front view (FIG. 10B) better shows the coil 42 in place about the pole piece or core 44. The screw 58, which holds the core 44 in place inside the motive device 34, is also shown in both FIGS. 10A and 10B.

The pole piece or core 44 is waisted to accommodate the coil 42. However, the core 44 flares out at its end 142, proximate the permanent magnet (not shown in FIG. 10 but shown in FIG. 3B), in order to maximize the area of the air gap—and thus the magnetic flux—between the core and the permanent magnet. By maximizing the area of the flux path at the air gap between the core 44 and the permanent magnet 48, greater magnetic attraction and repulsion can be achieved for a given amount of electrical excitation of the coil 42.

The core 44 is wider at its base, where it is held to the inside of the motive device 34. The two sides 140 of the core 44 project out at least as wide as the outside of the coil 42. Those two sides 140 are intended to be positioned as close to the sides of the adjacent cores as manufacturing tolerances will allow. The sides 140 of the core 44 are preferably not tapered to accommodate the radial angle of the inside of the motive device 34. The taper would be very slight and preferably not worth the expense, in view of the relatively large area of the sides 140 and the slight thickness of the air gap between adjacent cores.

The flared-out portion 142 of the top of each core 44 is flared out to a width slightly less than that of the sides 140. Also, the flared-out portion 142 of the top of the core 44 extends for a length only as far—in the direction of the axis of the screw 58—as is necessary to match the radial length of the adjacent permanent magnet 48. That length of the flared-out portion 142 is also the length of the core 44 in the direction of the axis of the screw 58, as indicated by two solid lines 144 in FIG. 10A. That length is also seen in FIG. 3B.

The flared-out portions 142 flare to a fairly sharp edge so as to minimize the flux leakage between adjacent cores 44. Such flux leakage between adjacent cores 44 constitutes a partial magnetic short circuit, since any such leaked flux between the tops of adjacent cores 44 reduces the amount of magnetic flux that can exert a circumferential force upon the permanent magnets 48 and thus the rotor 46.

While the form of the apparatus and method steps herein described constitute a preferred embodiment of the present invention, it is to be understood that the invention is not limited to this precise form of either the apparatus or method disclosed herein and that changes may be made therein without departing from the scope of the invention which is defined in the appended claims.

What is claimed is:

1. An electromagnetic actuator with a rotor portion having an axis and a perimeter and having a stator portion, said rotor portion rotating substantially at the same speed as a rotating shaft, for actuating control of an instrumentality rotated with said shaft by one of a relative position, juxtaposition, or phasing relationship between said rotor and said shaft, said electromagnetic activator comprising:

a plurality of permanently-magnetized regions located proximate the perimeter of said rotor portion, said permanently magnetized regions being polarized so that adjacent permanently magnetized regions about the perimeter of the rotor are of opposite magnetic polarity;

a plurality of electromagnets each having a core and a coil surrounding the core mounted on the stator and positioned proximate the permanently magnetized regions, said electromagnets being subject to energization so that adjacent poles of said cores are of opposite magnetic polarity;

the energization of the electromagnets causing a reversal of polarity at a frequency proportional to the rotational speed of the rotor, such that the cores reverse polarity each time that a permanently magnetized region on the rotor advances from being proximate one core to being proximate the adjacent core;

the phasing of the reversals of the energizing polarity of the electromagnets being variable with respect to the rotation of the shaft so as to control the phasing of the instantaneous rotational position of the rotor with respect to the shaft; and a linkage means for extracting a relative-position signal from the juxtaposition of said rotating shaft and said rotor portion for affecting said instrumentality.

2. An electromagnetic actuator according to claim 1 wherein said rotor is generally disk-shaped, with a thickness in the axial direction of the rotor that is substantially less than the peripheral diameter of the rotor.

3. An electromagnetic actuator according to claim 2 wherein the magnetic flux path of said permanently magnetized regions is in a direction substantially parallel with the axis of the rotor.

4. An electromagnetic actuator according to claim 2 wherein the magnetic flux path of said permanently magnetized regions is in a direction substantially perpendicular to the axis of the rotor.

5. An electromagnetic actuator according to claim 1 wherein said rotor is arranged substantially coaxial with said shaft.

6. An electromagnetic actuator according to claim 1 wherein said stator substantially surrounds said rotor and a portion of said shaft.

7. An electromagnetic actuator according to claim 6 wherein said electromagnets are positioned within the stator, adjacent to the perimeter of the rotor and remote from the shaft.

8. An electromagnetic actuator according to claim 1 further comprising a sensor for sensing the rotational position of the rotor.

9. An electromagnetic actuator according to claim 8 further comprising means for reversing the energization of said electromagnets each time that a permanently-magnetized region coincides with a location of a core.

10. A method of actuating control of an instrumentality rotating with a shaft, using an electromagnetic actuator with a rotor portion normally rotating substantially at the same speed as the shaft and having a plurality of permanent magnets mounted in proximity to the periphery of said rotor and being arranged with alternate polarity around the rotor and having a stator with a plurality of electromagnets each having a core and a coil surrounding the core mounted thereon for cooperation with the permanent magnets, the method comprising:

applying electric current to said electromagnets so as to produce alternate polarity therein in a pattern substantially to cooperate with the permanent magnets;

reversing the direction of electrical current through the electromagnets as the rotor advances from electromagnet to electromagnet, in order to apply a magnetically-induced force to each permanent magnet by its instantaneously associated electromagnet;

changing the timing relationship between the reversal of the electrical current through the electromagnets and the movement of the shaft so as to change the timing of the application of electromagnetic force on the rotor with respect to the shaft in order to affect the phase relationship between the rotor and the shaft; and communicating to the instrumentality the difference in phase between the rotor and the shaft as a mechanical motion within the instrumentality.

* * * * *